(12) United States Patent
Sakai et al.

(10) Patent No.: US 6,388,977 B1
(45) Date of Patent: May 14, 2002

(54) HOLOGRAM LASER UNIT AND OPTICAL PICKUP DEVICE INCLUDING THE SAME

(75) Inventors: Keiji Sakai, Nara; Yasuo Nakata, Takaichi-gun, both of (JP)

(73) Assignee: Sharp Kabushiki, Kaisha (JP)

( * ) Notice: Subject to any disclaimer, the term of this patent is extended or adjusted under 35 U.S.C. 154(b) by 0 days.

(21) Appl. No.: 09/334,173

(22) Filed: Jun. 15, 1999

(30) Foreign Application Priority Data

Jun. 15, 1998 (JP) .......................................... 10-167564

(51) Int. Cl.[7] ................................................ G11B 7/00
(52) U.S. Cl. ................. 369/112.12; 369/94; 369/44.37; 369/103; 369/122
(58) Field of Search .......................... 369/44.23, 44.37, 369/44.26, 112.11, 112.15, 112.26, 103, 118, 44.24, 44.27, 120, 112.17, 112.06, 112.1, 112.12, 116.94, 122, 109.2

(56) References Cited

U.S. PATENT DOCUMENTS

| 5,128,914 A | | 7/1992 | Kurata et al. ............. 369/44.37 |
|---|---|---|---|
| 5,446,719 A | * | 8/1995 | Yoshida et al. ............. 369/116 |
| 5,511,059 A | * | 4/1996 | Brazas, Jr. ............. 369/112.12 |
| 5,621,715 A | * | 4/1997 | Ohyama ...................... 369/103 |
| 5,696,750 A | * | 12/1997 | Katayama ............. 369/112.06 |
| 5,708,638 A | * | 1/1998 | Braat et al. ............. 369/112.02 |
| 5,710,753 A | * | 1/1998 | Brazas, Jr. ............. 369/112.04 |
| 5,745,265 A | * | 4/1998 | Hasegawa et al. ..... 369/112.21 |
| 5,982,732 A | * | 11/1999 | Yamanaka ............. 369/112.15 |
| 6,041,027 A | * | 3/2000 | Kim et al. ................. 369/44.24 |
| 6,069,860 A | * | 5/2000 | Mizuno et al. ........ 369/112.26 |
| 6,091,691 A | * | 7/2000 | Yoo et al. ................ 369/112.11 |
| 6,212,150 B1 | * | 4/2001 | Inoue et al. ............. 369/44.23 |
| 6,266,314 B1 | * | 7/2001 | Fukakusa et al. ........... 369/122 |

FOREIGN PATENT DOCUMENTS

| JP | 4-172627 | * | 6/1992 |
|---|---|---|---|
| JP | 6-124477 | | 5/1994 |
| JP | 8-45105 | | 2/1996 |
| JP | 9-138967 | * | 5/1997 |
| JP | 11-110772 | | 4/1999 |

* cited by examiner

Primary Examiner—David Hudspeth
Assistant Examiner—Kim-Kwok Chu
(74) Attorney, Agent, or Firm—David G. Conlin; Steven M. Jensen; Edwards & Angell, LLP (57) ABSTRACT

A hologram laser unit to be used for performing recording and reproducing operations of information for an optical disk, includes a light source, a photodetector, and a hologram element which are formed integrally with each other. The hologram element includes: a first hologram for detecting information signals from the optical disk, the first hologram being provided in an area having an effective diameter corresponding to a numerical aperture suitable for the optical disk; and a second hologram for compensating for only a transmitted light amount of light traveling toward the optical disk from the light source, the second hologram being provided contiguously outside the first hologram.

7 Claims, 8 Drawing Sheets

HOLOGRAM LASER UNIT AND OPTICAL PICKUP DEVICE INCLUDING THE SAME

BACKGROUND OF THE INVENTION

1. Field of the Invention

The present invention relates to an optical pickup device for use in an optical disk apparatus for optical recording/reproduction of information on recording media such as optical disks, and a hologram laser unit to be incorporated in such an optical pickup device. More particularly, the present invention relates to an optical pickup device which is capable of performing accurate recording/reproducing operations for a plurality of types of optical disks having different recording densities; and a hologram laser unit to be incorporated in such an optical pickup device.

2. Description of the Related Art

In recent years, optical disks capable of recording signals representing a large amount of information at a high density have been utilized in a number of fields including audio, video, and computer applications. Compact disks (CDs), video disks, mini-disks (MDs), and magneto-optical disks for computers, which are widely commercially available now, generally employ a substrate which is 1.2 mm thick. Accordingly, optical pickup devices for use in performing recording and reproducing operations of information for these optical disks are designed so as to correct the aberration due to the 1.2 -thick substrate by utilizing an objective lens incorporated in the optical pickup devices.

A variety of attempts have been made to enhance the recording capacity of optical disks. Among these attempts is a method of improving the optical resolution by employing an objective lens having an increased numerical aperture (NA), and a method of recording or reproducing information by employing light (laser light) having a shorter wavelength.

The diameter φ of a converged beam spot on an optical disk can be represented by the following formula:

$$\phi = K \times \lambda / NA$$

where K is a constant; NA is the numerical aperture of the objective lens; and λ is the wavelength of a laser beam used. According to the above equation, the converged beam diameter φ decreases in inverse proportion to the numerical aperture NA. On the other hand, tolerance for a tilt of the optical disk decreases in proportion to the numerical aperture of the objective lens to the power of 3 (i.e., $NA^3$). Therefore, in order to increase the numerical aperture NA of the objective lens while maintaining the same level of tolerance for the tilt of the optical disk, it is necessary to reduce the thickness of the substrate of the optical disk. Specifically, when the numerical aperture NA of the objective lens is increased from 0.5 to 0.6, for example, the thickness of the substrate (i.e., the substrate thickness) of the optical disk is required to be reduced to approximately 0.6 mm in order to maintain the same level of tolerance for the tilt of the disk as that of an optical disk having a 1.2 -thick substrate.

Thus, in order to realize a higher-density optical disk, it is necessary to optimize both the substrate thickness of the optical disk and the numerical aperture (NA) of the objective lens used in the optical pickup device.

However, if the substrate thickness of the optical disk is reduced as described above, the optical disk is no longer compatible with optical disks having a substrate of a conventional thickness. Accordingly, it becomes necessary to adjust the numerical aperture (NA) of the objective lens in the optical pickup device in accordance with the substrate thickness of the optical disk.

In this connection, for example, Japanese Laid-Open Publication No. 8-45105 discloses a method of adaptably changing the numerical aperture NA of the objective lens.

Specifically, the above laid-open publication describes means for selectively changing an aperture of an objective lens (hereinafter referred to as "selective aperture changing means") which is provided integrally with a moving unit for the objective lens. The selective aperture changing means is configured so that the aperture is effectively changed by inserting into or retracting from the optical path a plate for restricting the aperture, or by partially varying the transmittance of a liquid crystal plate. The use of such selective aperture changing means makes it possible to adaptably change the numerical aperture NA of the objective lens in the optical pickup device according to different substrate thicknesses of the optical disk.

Furthermore, Japanese Laid-Open Publication No. 6-124477 discloses a method of changing the numerical aperture NA using a liquid crystal filter and a polarizing filter.

Specifically, as described in the above laid-open publication, a predetermined pattern of electrodes are attached to a liquid crystal filter. For example, the electrodes may be patterned into an inner portion and an outer portion defining concentric circles. By applying a voltage to the respective portions of the patterned electrodes with appropriate timing, some portions of the filter are imparted with a polarization direction which is rotated by 90 degrees from that of the other portions. As a result, light which has passed through the liquid crystal filter is selectively divided into portions having different polarization states. When light having such portions of selectively varied polarization states is allowed to pass through a polarization beam splitter, the light is divided into a reflection light component and a transmittance light component depending on the polarization states. By configuring the optical system so that only the transmittance light component enters the objective lens, the diameter of the light beam entering the objective lens can be varied. As a result, the numerical aperture NA of the objective lens can be effectively changed.

However, the various aforementioned conventional methods of changing the numerical aperture NA have the following problems.

The method in which the aperture restriction plate is placed in and out of the optical path requires a mechanism capable of highly precisely performing the insertion and retraction of the aperture restriction plate, resulting in an increase in the size and manufacturing cost of the device thereby adversely affecting mass production. Moreover, since the insertion/retraction mechanism is required to be integrated and driven with the moving unit for the optical pickup, the mass of the moving unit is inevitably increased so as to degrade the servo performance of an actuator used for driving the moving unit.

The method using the liquid crystal plate does not require any additional moving mechanism. However, in the case where the liquid crystal plate is integrated with the moving unit for the optical pickup device, the whole size of the moving unit is increased. Furthermore, a movable mechanism for supplying operating power is required to securely supply a necessary voltage to the electrodes attached to the liquid crystal plate as the liquid crystal plate is moved along with the moving unit.

Alternatively, in the case where the liquid crystal plate is provided separately from the moving unit, the optical axis of the lens may be misaligned with respect to the center of the pattern of the liquid crystal plate as the objective lens is driven. Moreover, regardless of whether the liquid crystal plate is integrated with the moving unit or not, the liquid crystal materials contained in the liquid crystal plate are susceptible to a change in their characteristics (e.g., refractive index) due to a change in temperature. Therefore, such a device may not exhibit the desired performance due to changes in the environmental conditions.

In addition, all of the above-described methods require an additional mechanism in the optical pickup device, likely causing drawbacks such as complicated configuration and increase in cost.

SUMMARY OF THE INVENTION

A hologram laser unit of the present invention is to be used for performing recording and reproducing operations of information for an optical disk. The hologram laser unit includes a light source, a photodetector, and a hologram element which are formed integrally with each other. The hologram element includes: a first hologram for detecting information signals from the optical disk, the first hologram being provided in an area having an effective diameter corresponding to a numerical aperture suitable for the optical disk; and a second hologram for compensating for only an transmitted light amount of light traveling toward the optical disk from the light source, the second hologram being provided contiguously outside the first hologram.

Directions of diffraction of the first and second holograms may be substantially orthogonal with each other.

Preferably, there is no substantial difference between a pitch of the first hologram and a pitch of the second hologram.

The hologram laser unit may further include a second photodetector corresponding to the second hologram.

The second photodetector may be divided into a plurality of portions substantially along a radius direction of the optical disk.

According to another aspect of the present invention, an optical pickup device is provided for performing recording and reproducing operations of information for both a first optical disk having a substrate of a first thickness and a second optical disk having a substrate of a second thickness which is thinner than the first thickness. The optical pickup device includes an objective lens and two hologram laser units each including a light source having a different wavelength. The objective lens is provided with an aperture which is formed based on a numerical aperture suitable for the second optical disk. A first hologram laser unit among the two hologram laser units to be used for performing recording and reproducing operations of information for the first optical disk includes a light source, a photodetector, and a hologram element which are formed integrally with each other. The hologram element includes: a first hologram for detecting information signals from the optical disk, the first hologram being provided in an area having an effective diameter corresponding to a numerical aperture suitable for the optical disk; and a second hologram for compensating for only a transmitted light amount of light traveling toward the optical disk from the light source, the second hologram being provided contiguously outside the first hologram.

The optical pickup device may further include a collimator lens, wherein the first hologram laser unit is disposed between the collimator lens and a focal point of the collimator lens.

According to the present invention, two types of holograms (i.e., a first hologram for detecting signals and a second hologram for compensating for the amount of transmitted light) are formed in a hologram element in a hologram laser unit. As a result, any redundant information other than that provided from an optical disk via a required numerical aperture is cut off by the second hologram (i.e., the compensation hologram) when the reflected light from the optical disk returning toward the hologram laser unit is diffracted by the hologram element. Thus, effects which would normally be obtained by providing an aperture can be effectively obtained without incorporating additional aperture.

By providing the second hologram outside the first hologram in a positionally contiguous manner, the variation in the light amount of a converged light spot on the optical disk can be minimized despite possible shifts in the position of the objective lens during tracking.

By providing the two types of holograms so that the respective diffraction directions thereof are substantially orthogonal with each other, the returning light diffracted by the second hologram (for compensating for the amount of transmitted light) can be prevented from becoming stray light that enters the photodetector of the hologram laser unit.

By providing the two types of holograms so that their respective pitches do not have substantial difference therebetween, there occurs no large difference between the amounts of transmitted light from the hologram laser unit into the optical disk, even when the two types of holograms are simultaneously processed. As a result, deterioration of the convergence characteristics on the optical disk can be prevented.

By providing an additional photodetector corresponding to the second hologram (for compensating for the amount of transmitted light) in the hologram laser unit, sufficient information signals can be secured even when reproducing an optical disk which calls for a larger numerical aperture than that is prescribed for the hologram laser unit.

By providing a photodetector corresponding to the second hologram so as to be divided into a plurality of portions substantially along the direction of a radius of an optical disk, it becomes possible to detect the shift amount of the objective lens.

Assume that an optical pickup device includes an object lens and two hologram units each having light sources of different wavelengths, and performs recording and reproducing operations of information for both a first optical disk having a substrate of a first thickness and a second optical disk having a substrate of a second thickness which is smaller than the first thickness. In such a case, by employing a hologram laser unit having the above-described features of the present invention as the first hologram laser unit to be used for the information recording/reproducing operations for the first optical disk, it becomes unnecessary to adjust the numerical aperture of the objective lens in accordance with the substrate thicknesses of optical disks during the recording and reproduction thereof.

By disposing one of the above-mentioned two hologram laser units to be used for optical disks with thicker substrates in a position between the collimator lens and the focal point thereof, the spherical aberration depending on the difference between the substrate thicknesses can be compensated for.

Thus, the invention described herein makes possible the advantages of (1) providing a hologram laser unit which can perform recording and reproducing operations of information for multiple types of optical disks having different substrate thicknesses with the use of the same objective lens by providing a variable numerical aperture, without degrading the optical performance or requiring a complicated mechanism or resulting in an increased cost, and which provides excellent mass-productivity and reliability; and (2) providing an optical pickup device incorporating such a hologram laser unit.

These and other advantages of the present invention will become apparent to those skilled in the art upon reading and understanding the following detailed description with reference to the accompanying figures.

DESCRIPTION OF THE PREFERRED EMBODIMENTS

Hereinafter examples of the present invention will be described with reference to the accompanying drawings.

Example 1

Figure 1:
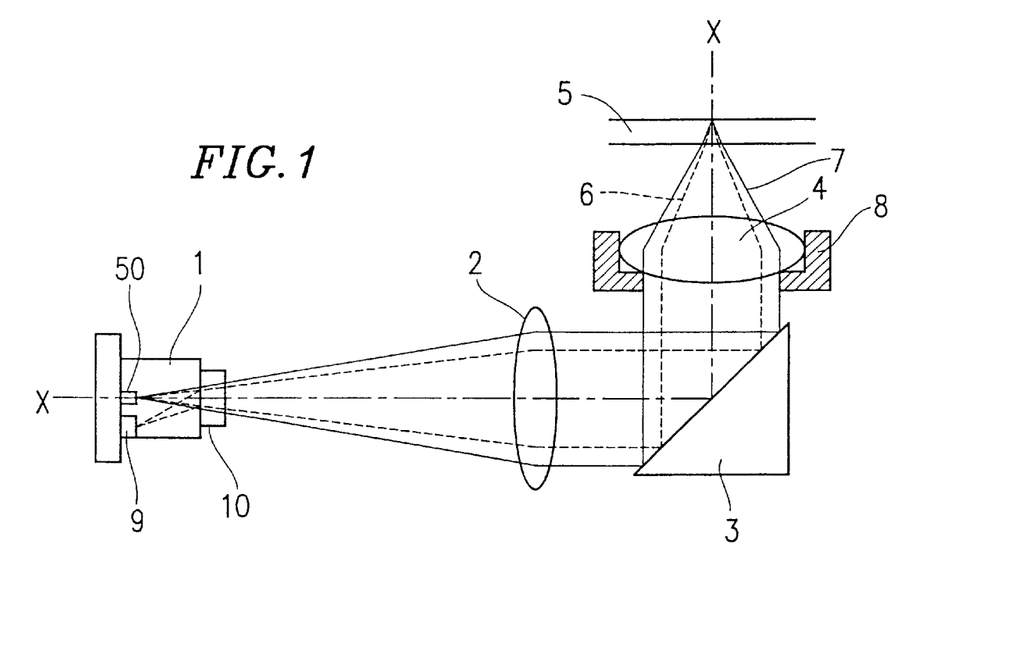
FIG. 1 is a diagram illustrating a configuration of an optical system of an optical pickup device including a hologram laser unit according to Example 1 of the present invention.

FIG. 1 is a diagram illustrating an optical system of an optical pickup device including a hologram laser unit according to Example 1 of the present invention. The illustrated optical pickup device is intended for use with optical disks.

Light emitted from a light source 50 incorporated in a hologram laser unit 1 passes through a collimator lens 2. After the direction of the optical path is changed by a mirror 3, the light enters an objective lens 4. The light is converged on an optical disk 5 by the objective lens 4. After being reflected from the optical disk 5 so as to be modulated in accordance with the information carried thereon, the light passes back through the objective lens 4, the mirror 3, and the collimator lens 2 to return to the hologram laser unit 1. In entering the hologram laser unit 1, the light is diffracted by a hologram element 10 incorporated therein and then enters a photodetector 9 within the unit 1. The photodetector 9 detects from the incident light beam the information signals that have been read from the optical disk 5.

Of the light beams entering the optical disk 5 from the objective lens 4, a light beam 6 is defined by a numerical aperture (hereinafter referred to as "numerical aperture A") which is required for recording and reproducing information on the optical disk 5. On the other hand, a light beam 7 is the outermost beam, which is defined by a numerical aperture (hereinafter referred to as "numerical aperture B") that is determined by an aperture 8 provided under the objective lens 4. Lines X—X represent an optical axis of the optical system of the optical pickup device.

FIG. 1 shows an example of infinite optical system including the collimator 2. The present invention can also be applied to a finite optical system not including the collimator lens 2.

Figure 2A:
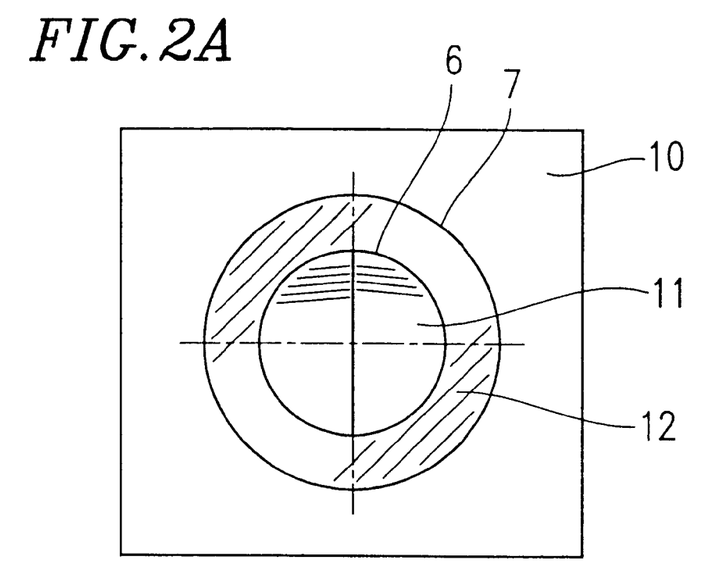
FIG. 2A is a plan view schematically illustrating a configuration of a hologram element for use in the hologram laser unit of the optical system in FIG. 1.

FIG. 2A is a plan view schematically illustrating a configuration of the hologram element 10 for use in the hologram laser unit 1.

The hologram element 10 includes two portions, i.e., a hologram 11 for detecting signals and a hologram 12 for compensating for the amount of transmitted light. It should be noted that the hologram configuration is not limited to the basic divided-in-two configuration shown in FIG. 2A. The hologram may be divided into more than two portions depending on the method of detecting servo signals.

In FIG. 2A, the hologram 11 for signal detection (also referred to as the detection hologram), which is provided closer to the center of the hologram element 10, has an external diameter equal to that of the light beam 6. On the outside of the hologram 11, the hologram 12 is provided only for compensating for the amount of zero-order transmitted light among the incoming light traveling from the hologram laser unit 1 to the optical disk 5. (The hologram 12 is also referred to as the compensation hologram.) The external diameter of the compensation hologram 12 is prescribed to be larger than that of the light beam 7 in FIG. 1. The detection hologram 11 is provided so as to diffract the reflected light from the optical disk 5 toward the photodetector 9. The compensation hologram 12 is arranged so as to prevent the diffracted light from traveling toward the photodetector 9.

The size of the aperture 8 is defined so that the light beam 6 is not shaded even when the objective lens 4 is shifted during tracking. Similarly, the external diameter of the compensation hologram 12 is defined so that the light beam 7 passing through the aperture 8 is not shaded even when the objective lens 4 is shifted during tracking.

In the optical system in FIG. 1, the light beam 7 having an external diameter corresponding to numerical aperture B enters the optical disk 5. Such incoming light is reflected from the optical disk 5, and the resultant reflected light returns to the hologram element 10 with a beam diameter corresponding to numerical aperture B, just like it did when entering the optical disk 5. However, since the detection hologram 11 is present only in an area corresponding to numerical aperture A, only a portion of the returned light that corresponds to numerical aperture A enters the photodetector 9. Thus, even in the case where numerical aperture B of the aperture 8 at the objective lens 4 is larger than numerical aperture A (i.e., a numerical aperture which is actually required for recording and reproducing information on the optical disk), only the information carried by a beam having a size corresponding to the required numerical aperture A is detected from the optical disk 5.

As described above, in accordance with the optical pickup device of Example 1 of the present invention, it is possible to set a required numerical aperture by using the hologram element 10 which is incorporated in the hologram laser unit 1 and includes two types of holograms 11 and 12, without providing any additional aperture for restricting excessive light beams.

The two types of holograms 11 and 12 incorporated in the hologram laser unit 1 do not need to be special holograms such as polarizing holograms; they can be produced with a generally-known method of producing holograms. Moreover, the desired performance can be obtained by changing only the mask patterns for forming the holograms 11 and 12, without incorporating any additional elements. The mass-productivity, reliability, and cost of the hologram laser unit of the present invention are equivalent to those of a conventional hologram laser unit.

Figure 3A:
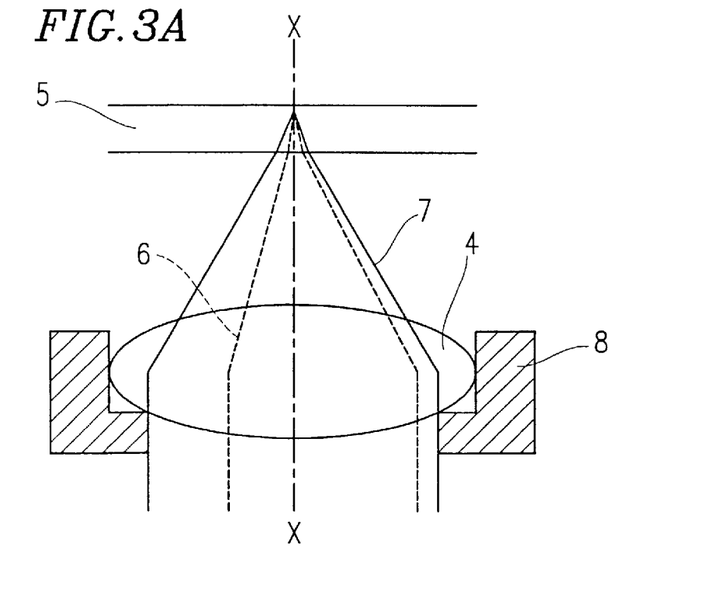
FIG. 3A is a schematic diagram illustrating light beams when an objective lens in the optical system in FIG. 1 is shifted.

FIG. 3A schematically illustrates light beams when the objective lens 4 is shifted during tracking.

In the case where such a shift occurs, the light beam 6 that has passed through the hologram element 10 (see FIG. 1) is displaced from the center of the objective lens 4, so that the outer portion of the light beam 6 passes near the optical axis X—X. Although the outer portion of the light beam 6 has passed through the compensation hologram 12, fluctuation in the amount of light entering the objective lens 4 can be prevented despite the possible displacement of the light beam as described above by prescribing the pitches of the holograms 11 and 12 so as not to have a substantial difference therebetween so that the zero-order diffraction efficiency of the holograms 11 and 12 becomes substantially the same.

The actual pitches of the holograms 11 and 12 are affected by the performance or precision of the devices which are used in processing the hologram element. Preferably, the pitches of the hologram 11 and 12 are substantially the same. In this connection, it is necessary to take the following points into consideration.

Theoretically, the diffraction efficiency of the holograms 11 and 12 is determined by the depth of the groove as measured in a cross-section of the hologram, and is independent of the pitches thereof. However, in the case where the pitches of the holograms 11 and 12 are relatively small compared to the wavelength of the light used, the holograms 11 and 12 acquire polarization characteristics so as to have a large influence on the diffraction efficiency. On the other hand, even when the pitches of the holograms 11 and 12 are relatively large as compared to the wavelength of the light used, if there is a large difference between the pitches of the holograms 11 and 12, differences may occur between the holograms 11 and 12 in the depth of the groove or the groove wall configuration (e.g., duty ratio and tapered angle) during a simultaneous processing of the holograms 11 and 12. Moreover, in the actual design of a hologram unit, it would be unrealistic, in view of the size of the unit, to provide a large difference between the diffraction angles of the holograms 11 and 12 by providing a large difference between the pitches thereof.

Thus, considering the above-described points, satisfactory results can be obtained by providing the holograms 11 and 12 so that there is no large difference between the pitches thereof.

Figure 3B:
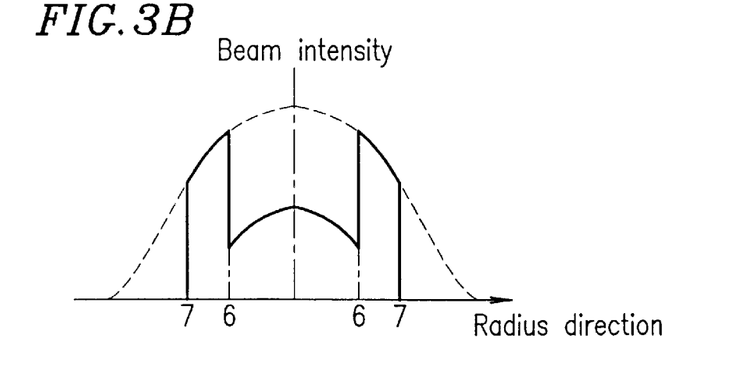
FIG. 3B is a schematic diagram illustrating the distribution of intensities of a light beam, along the radius direction thereof, that has passed through the hologram element in the case where a hologram for compensating for the amount of transmitted light according to the present invention is not provided.
Figure 3C:
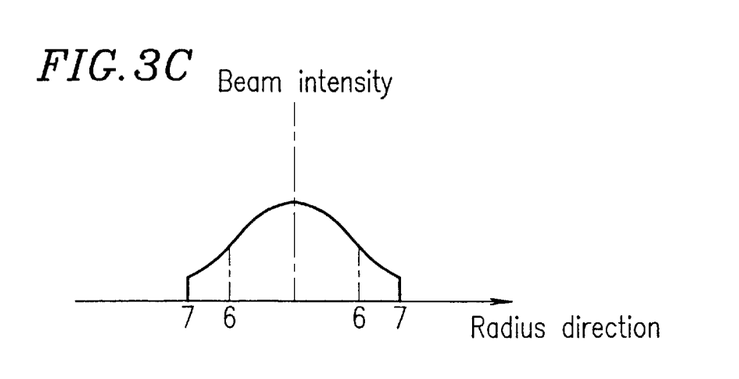
FIG. 3C is a schematic diagram illustrating the distribution of intensities of a light beam, along the radius direction thereof, that has passed through the hologram element in the case where a hologram for compensating for the amount of transmitted light according to the present invention is provided.

FIGS. 3B and 3C schematically illustrate the distribution of the intensity of a light beam which has passed through the hologram element 10, along a radius direction of the beam, with respect to the cases where the compensation hologram 12 of the present invention is not provided (FIG. 3B) and where the compensation hologram 12 is provided (FIG. 3C), respectively.

As shown in FIG. 3B, when the compensation hologram 12 is not provided, the beam intensity is discontinuous along the radius direction, and the intensity of a portion corresponding to the light beam 7 is several times the intensity of a portion corresponding to the light beam 6. Therefore, even when no unwanted shift of the objective lens 4 occurs during tracking, the difference in the beam intensity will deteriorate the beam convergence characteristics. When the objective lens 4 is shifted, an imbalance of the beam intensity will occur with respect to the optical axis, resulting in further deterioration of the beam convergence characteristics.

In contrast, by providing the compensation hologram 12 according to the present invention, the aforementioned problems associated with discontinuity of the beam intensity can be solved, as seen from FIG. 3C.

As described above, by providing the compensation hologram 12 according to the present invention, the adverse influences on the optical pickup device due to discontinuity of the beam intensity along the radius direction and a shift of the objective lens 4 during tracking can be controlled.

Figure 2B:
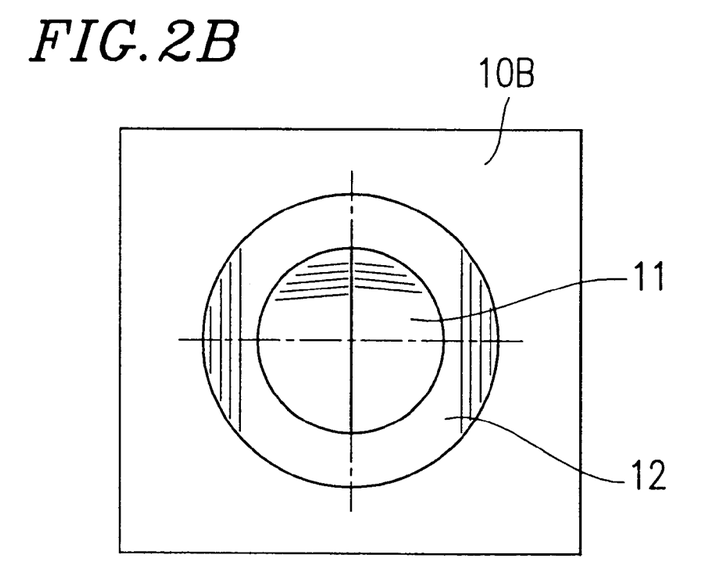
FIG. 2B is a plan view schematically illustrating another configuration of a hologram element for use in the hologram laser unit of the optical system in FIG. 1.

FIG. 2B is a plan view schematically illustrating a hologram element 10B having a modified configuration. Specifically, the compensation hologram 12 is provided so that the diffraction direction thereof is substantially perpendicular to the diffraction direction of the detection hologram 11. In such a configuration, when the reflected light traveling from the optical disk 5 to the hologram laser unit 1 is diffracted by the compensation hologram 12, the resultant ±first-order diffracted light travels toward a position totally different from the photodetector 9 to be used for detecting information signals, thereby preventing the diffracted light from entering the photodetector 9 as stray light.

Example 2

Figure 4:
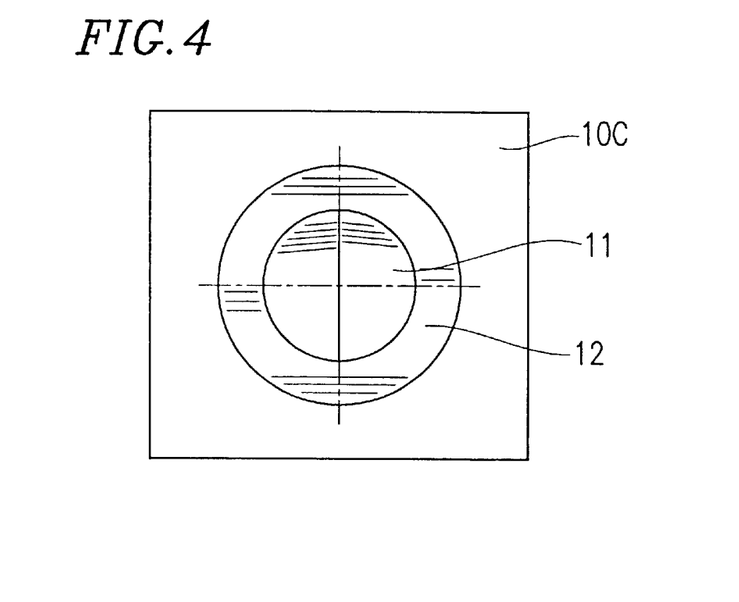
FIG. 4 is a plan view schematically illustrating a configuration of a hologram element for use in a hologram laser unit of an optical pickup device according to Example 2 of the present invention.
Figure 5:
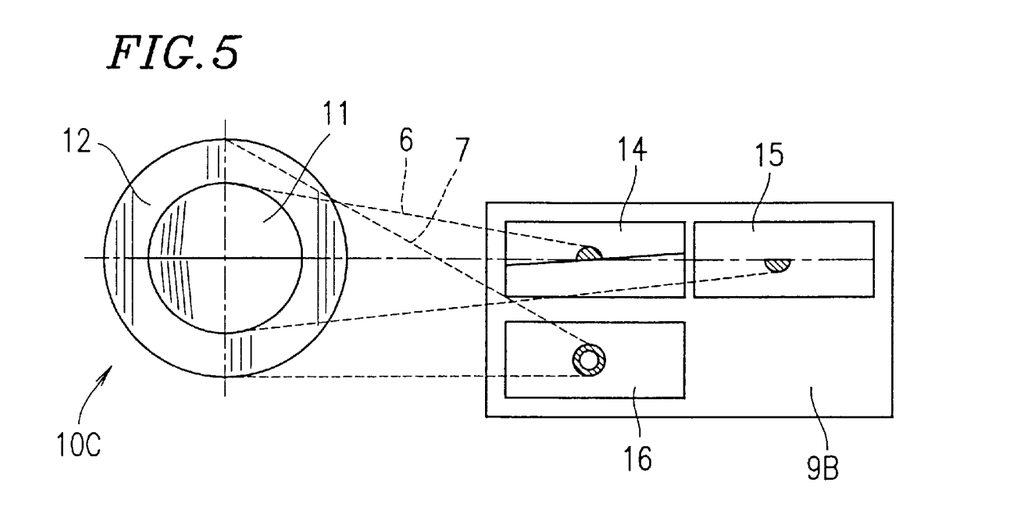
FIG. 5 is a schematic diagram illustrating a functional relationship between a photodetector and the hologram element in FIG. 4, in a hologram laser unit of an optical pickup device according to Example 2.

FIG. 4 is a schematic diagram illustrating a configuration of a hologram element 10C which may be incorporated in a hologram laser unit in an optical pickup device according to Example 2 of the present invention. FIG. 5 is a schematic diagram illustrating a functional relationship between the hologram element 10C in FIG. 4 and a photodetector 9B, in a hologram laser unit for use in the optical pickup device of Example 2.

In the photodetector 9B, light receiving elements 14 and 15 are provided for detecting information signals (including servo signals) on an optical disk. A light beam 6, which is a portion of reflected light from the optical disk which is diffracted by a detection hologram 11, enters the light receiving elements 14 and 15. A reproduction signal, a focus servo signal, and a tracking servo signal can be detected, for example, from the sum signal of the signals which are detected by the light receiving elements 14 and 15, the difference signal of the signals which are detected by the two divided regions of the light receiving element 14, and the difference signal of the signals which are detected by the light receiving elements 14 and 15, respectively.

A light receiving element 16 is additionally provided in the photodetector 9B. The light receiving element 16 receives returning first-order diffracted light generated (diffracted) by the compensation hologram 12. Specifically, a portion (shown as a light beam 7) of the reflected light from the optical disk corresponding to a larger numerical aperture than the above-described numerical aperture A (i.e., a partial light beam lying outside the hologram 11), is diffracted by the compensation hologram 12 and enters the photodetector 16. The loss in the amount of reproduced signals (except for servo signals) can be minimized by acquiring information from the partial light beam corresponding to the numerical aperture larger than numerical aperture A by utilizing the detected signals (information) from the photodetector 16 as described above.

Figure 6:
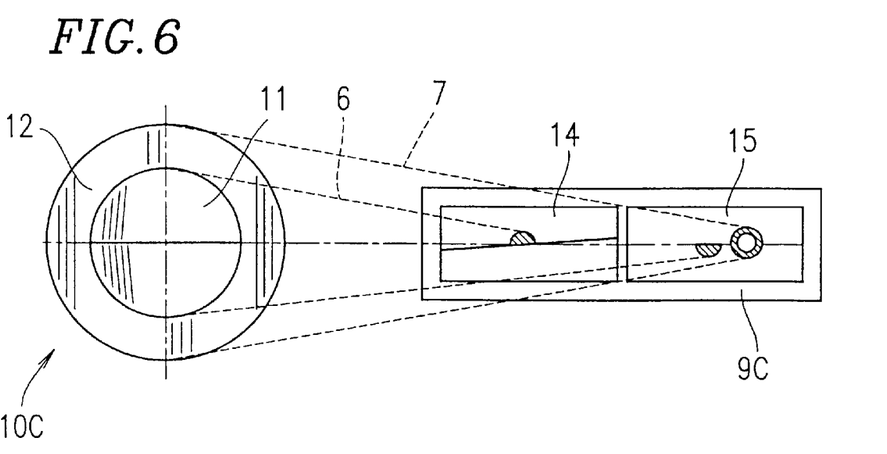
FIG. 6 is a schematic diagram illustrating a functional relationship between a photodetector and a hologram element, in a hologram laser unit of another optical pickup device according to Example 2.

Alternatively, in the case where the tracking servo signal is controlled with a commonly used 3-beam method, only the reproduced signal needs to be detected by the light receiving element 15. In this case, as shown in FIG. 6, the holograms 11 and 12 can be designed so that a light beam 6, which is a portion of the reflected light from the optical disk having the same size as that of the detection hologram 11, is diffracted by the detection hologram 11 so as to enter the light receiving elements 14 and 15 and that the first-order diffracted light (the light beam 7) diffracted by the compensation hologram 12 also enters the light receiving element 14 or 15. Thus, the loss in the amount of reproduced signals (except for servo signals) can be minimized without providing the above-described light receiving element 16 in the photodetector 9C.

Figure 7:
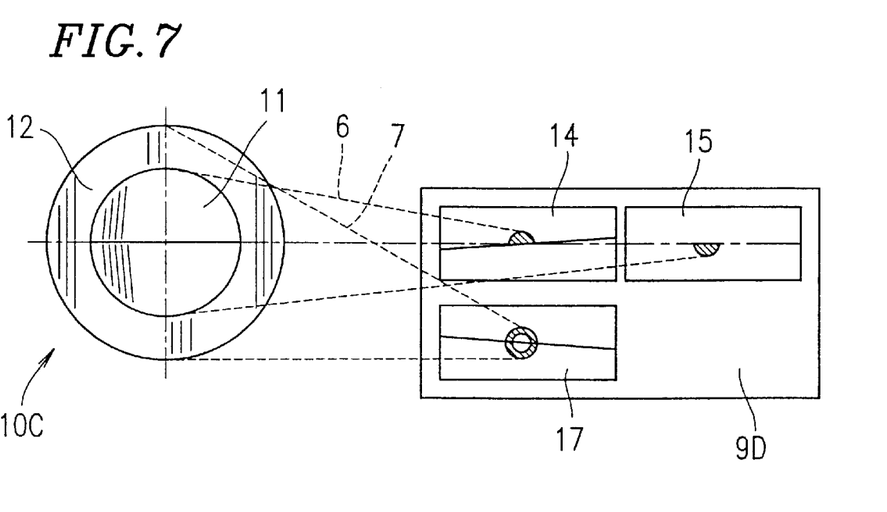
FIG. 7 is a schematic diagram illustrating a functional relationship between a photodetector and a hologram element, in a hologram laser unit of still another optical pickup device according to Example 2.

Furthermore, as is seen from a photodetector 9D in FIG. 7, an additional light receiving element (corresponding to the light receiving element 16 in FIG. 5, and indicated by reference numeral 17 in FIG. 7) can be divided into, for example, two portions substantially along the radius direction of the optical disk, so that a reproduced signal can be detected from a sum signal of the detected signals from the respective divided regions, and information concerning the shift of an objective lens can be detected by a difference signal therebetween. Thus, the information concerning the shift of the objective lens can be detected only by the light receiving element 17 in FIG. 7, even in the case where the information included in any light corresponding to a numerical aperture greater than numerical aperture A (which is the numerical aperture of the detection hologram 11) is not utilized.

Example 3

An exemplary configuration of an optical pickup device according to Example 3 of the present invention will be described with reference to FIG. 8.

Figure 8:
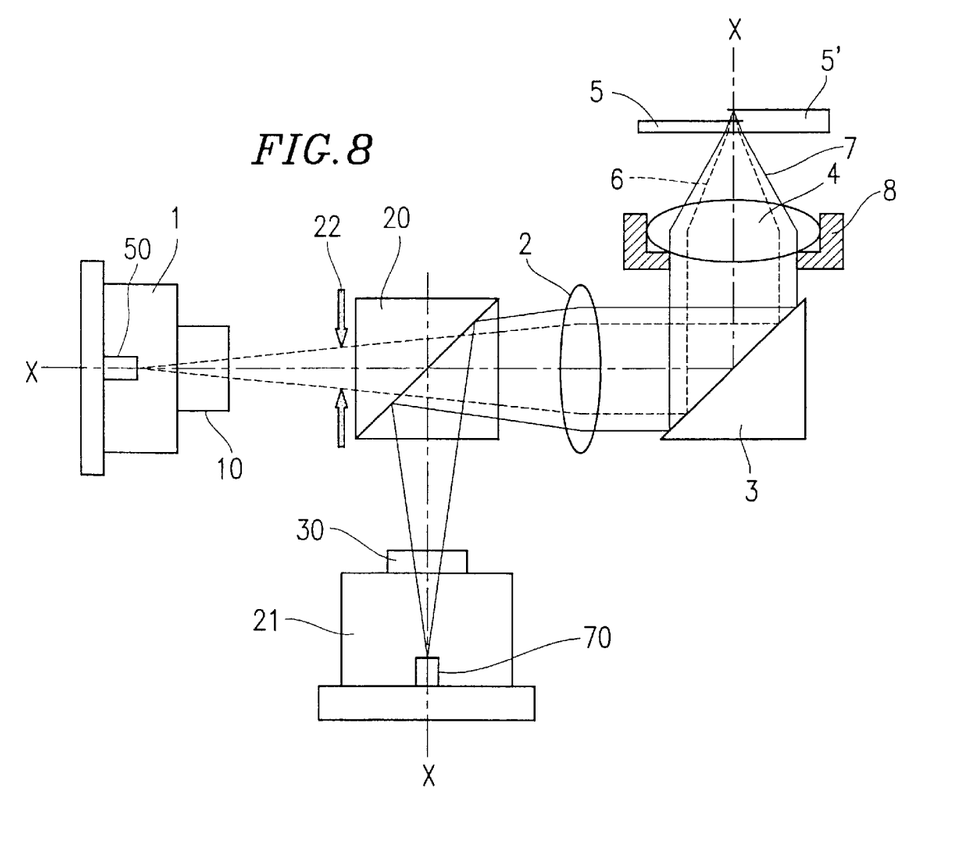
FIG. 8 is a diagram illustrating a configuration of an optical system of an optical pickup device according to Example 3 of the present invention.

An optical pickup device shown in FIG. 8 includes two hologram laser units 1 and 21 having light sources 50 and 70 of different wavelengths, respectively, and an objective lens 4, and is capable of performing information recording/reproduction for optical disks 5 and 5' having different (i.e., two in the illustrated example) substrate thicknesses. For example, the hologram laser unit 1 can include a light source 50 having a wavelength of 780 nm while the hologram laser unit 21 can include a light source 70 with a wavelength of 650 nm. Furthermore, assuming that the optical disks 5 and 5' to be detected include substrates which are 0.6 mm and 1.2 thick, respectively, the suitable numerical apertures corresponding to the optical disks 5 and 5' are 0.6 and 0.45, respectively.

The configuration shown in FIG. 8 will be explained in more detail.

When performing recording or reproducing operations of information for the thinner optical disk 5, light emitted from the light source 70 of the hologram laser unit 21 is reflected by a beam splitter 20, and is directed through a collimator lens 2. After the direction of the optical path is changed by a mirror 3, the light is converged on the optical disk 5 by the objective lens 4. The reflected light from the optical disk 5 passes back through the objective lens 4, the mirror 3, the collimator lens 2, and the beam splitter 20 to return to the hologram laser unit 21. The returned light is diffracted by a hologram element 30 incorporated in the hologram laser unit 21 to enter a photodetector not shown in FIG. 8. The numerical aperture is defined by an aperture 8 provided under the objective lens 4.

On the other hand, when performing recording or reproducing operations of information for the thicker optical disk 5', light emitted from the light source 50 of the hologram laser unit 1 is transmitted through the beam splitter 20, and is directed through the collimator lens 2. After the direction of the optical path is changed by the mirror 3, the light is converged on the optical disk 5' by the objective lens 4. The reflected light from the optical disk 5' passes back through the objective lens 4, the mirror 3, the collimator lens 2, and the beam splitter 20 to return to the hologram laser unit 1. The returned light is diffracted by a hologram element 10 incorporated in the hologram laser unit 1 to enter a photodetector not shown in FIG. 8.

The numerical aperture required for performing information recording/reproduction for the thicker optical disk 5' is smaller than the numerical aperture required for the thinner optical disk 5. Therefore, in the case where a conventional hologram laser unit is to be used, a suitable aperture must be inserted somewhere in the optical system in order to limit the numerical aperture. For example, an aperture 22 may be conventionally provided at a position where light from the hologram laser unit enters the beam splitter 20. (Although illustrated in FIG. 8, an aperture 22 is not required in the present invention, as described below.) Such an aperture 22 results in no problem in the case where the objective lens 4 is at a neutral position as shown in FIG. 8 (i.e., when the objective lens 4 is positioned correctly o n an optical axis X—X). However, if the objective lens 4 is shifted during tracking, the following problem may occur.

Figure 9A:
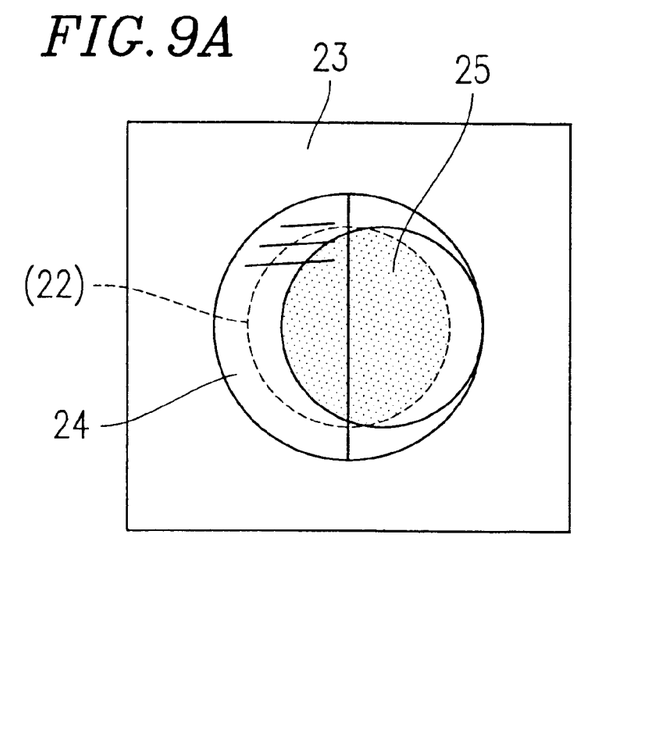
FIG. 9A is a diagram illustrating a positional relationship between a hologram element and light reflected from an optical disk in a conventional configuration.

FIG. 9A schematically illustrates a conventional hologram element 23 w here an aperture 22 limits the numerical aperture as described above. When the objective lens is shifted from the optical axis, reflected light 25 from the optical disk is also shifted (toward the right in FIG. 9A) from the center of a hologram 24, i.e., the optical axis. As a result, the reflected light from the optical disk is shaded by the aperture 22 by an amount corresponding to the shift, before it returns to the hologram element 23. Thus, the amount of light diffracted by the hologram 24 may change depending on the amount of shift of the objective lens.

Figure 9B:
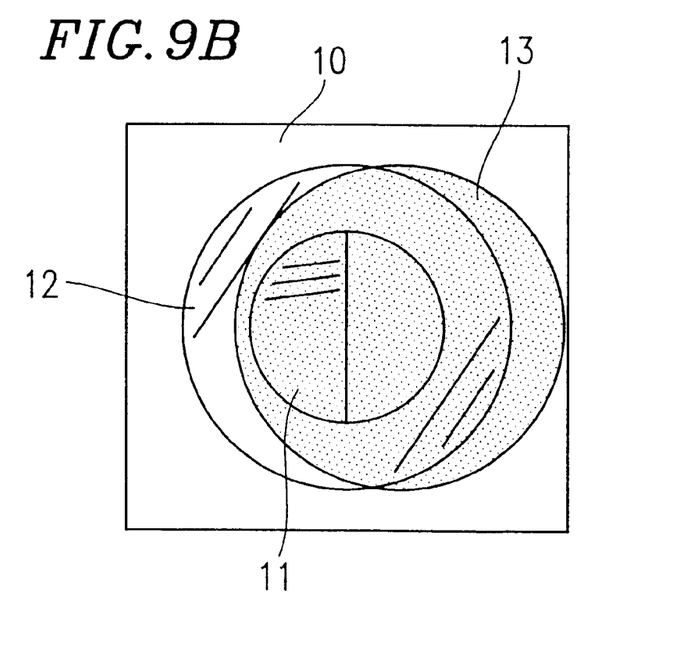
FIG. 9B is a diagram illustrating a positional relationship between a hologram element and light reflected from an optical disk in a configuration according to the present invention.

On the other hand, in accordance with the hologram element 10 of the present invention, any shift of the objective lens also results in a shift of the reflected light 13 from the optical disk from the center of the detection hologram 11 (which is on the optical axis), as described in FIG. 9B (illustrating a similar shift of an objective lens as illustrated in FIG. 9A). However, since no additional means for limiting the numerical aperture, such as an aperture 22 in FIG. 8, is required to be employed in the present invention, the reflected light 13 shifted is still larger than the detection hologram 11 and has a beam diameter equivalent to the compensation hologram 12, unlike in the conventional case illustrated in FIG. 9A. As a result, the beam is not shaded on the detection hologram 11, so that the amount of diffracted light remains constant even when the objective lens is shifted.

Thus, by incorporating the hologram laser unit of the present invention into an optical pickup device, a numerical aperture to be varied in accordance with the thicknesses of various optical disks can be obtained without employing expensive optical elements such as a wavelength plate or providing means for changing the numerical aperture of the objective lens. Furthermore, even if the objective lens is shifted, since the amount of light entering a photodetector remains constant, it is possible to obtain stable servo characteristics by employing a low-cost pickup configuration.

Example 4

Another exemplary configuration of an optical pickup device according to Example 4 of the present invention will be described with reference to FIG. 10. The same components as those in FIG. 8 are indicated by the same reference numerals as those used therein, and the descriptions thereof are omitted.

When a light beam is to be converged on two types of optical disks 5 and 5' having different substrate thicknesses by using a single objective lens 4, spherical aberration may occur depending on the substrate thickness. For example, when an objective lens which is suitable for an optical disk 5 having a 0.6 mm-thick substrate is employed to converge a light beam on an optical disk 5' having a substrate of 1.2 mm thick, a spherical aberration corresponding to the difference between the substrate thicknesses (i.e., 0.6 mm) occurs.

The optimum numerical aperture of the objective lens for the optical disk 5' having a 1.2 thick substrate is as small as 0.45, so that the amount of resulting aberration is not very large. Therefore, it is possible to perform recording and reproducing operations of information for the optical disk 5' without compensating for the aberration. However, it is still desired to minimize the aberration in order to stabilize the pickup characteristics.

Figure 10:
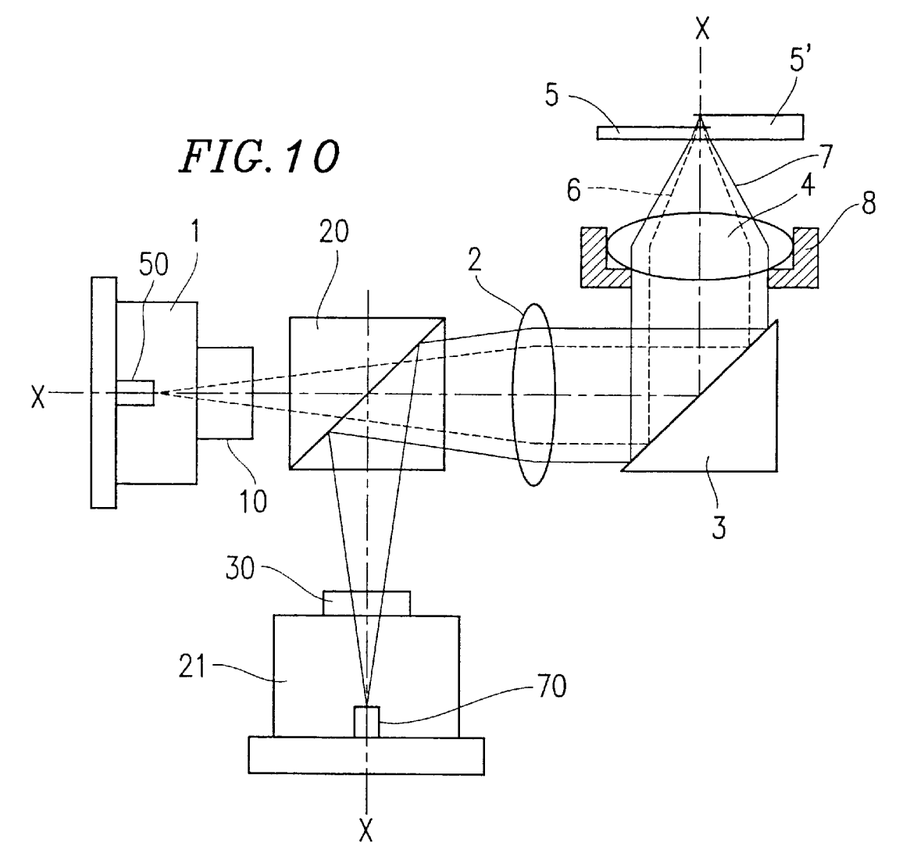
FIG. 10 is a diagram illustrating a configuration of an optical system of an optical pickup device according to Example 4 of the present invention.

In order to minimize such spherical aberration, in this example, as shown in FIG. 10, a hologram laser unit 1 suitable for the optical disk 5' having a 1.2 -thick substrate is shifted ahead of the focus of the collimator lens 2 so as to be positioned closer to the collimator lens 2 than the focus is. In other words, the hologram laser unit 1 for the optical disk 5' having a 1.2 -thick substrate is positioned between the collimator lens 2 and the focus thereof. Thus, the hologram laser unit 1 in FIG. 10 is positioned closer to the collimator lens 2 than in the configuration of FIG. 8.

Thus, diffused light is intentionally made to enter the objective lens 4 so as to cause an aberration which is the inverse of the aberration expected to occur depending on the difference between the thicknesses of the substrates, thereby canceling out the spherical aberration.

According to the present invention, two types of holograms (i.e., a first hologram for detecting signals and a second hologram for compensating for the amount of transmitted light) are included in a hologram laser unit. The area where the first hologram is formed is limited to have a diameter corresponding to a numerical aperture. NA necessary for recording/reproduction of a predetermined type of optical disks. The second hologram is formed outside the area to adjust the amount of the incoming zero-order transmitted light (traveling from the hologram laser unit to the optical disk). By providing the two types of holograms in such a manner, any redundant information other than that provided from the optical disk via a required numerical aperture is cut off by the second hologram (i.e., the compensation hologram) when the reflected light from the optical disk returning toward the hologram laser unit is diffracted by the second hologram. Thus, effects which would normally be obtained by providing an increased aperture can be effectively obtained without incorporating additional aperture means for restricting a numerical aperture.

By providing such a hologram laser unit, an optical pickup device is realized where information included in optical disks having different thicknesses is recorded and reproduced using a single objective lens.

Furthermore, by providing the second hologram contiguously outside the first hologram, the variation in the light amount of a converged light spot on the optical disk can be minimized despite possible shifts in the position of the objective lens during tracking.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A hologram laser unit for use in performing recording and reproducing operations of information for an optical disk, the hologram laser unit comprising a light source, a photodetector, and a hologram element which are formed integrally with each other, wherein the hologram element comprises:
a first hologram for providing information signals from the optical disk to photodetector, the first hologram being provided in an area having an effective diameter corresponding to a numerical aperture suitable for the optical disk; and
a second hologram for compensating for only a transmitted amount of light traveling toward the optical disk from the light source, the second hologram being provided contiguously outside the first hologram.

2. A hologram laser unit according to claim 1, wherein directions of diffraction of the first and second holograms are substantially orthogonal with each other.

3. A hologram laser unit according to claim 1, wherein there is no substantial difference between a pitch of the first hologram and a pitch of the second hologram.

4. A hologram laser unit according to claim 1, further comprising a second photodetector corresponding to the second hologram.

5. A hologram laser unit according to claim 4, wherein the second photodetector is divided into a plurality of portions substantially along a radius direction of the optical disk.

6. An optical pickup device for performing recording and reproducing operations of information for both a first optical disk having a substrate of a first thickness and a second optical disk having a substrate of a second thickness which is thinner than the first thickness, the optical pickup device comprising an objective lens and two hologram laser units each including a light source having a different wavelength, wherein the objective lens is provided with an aperture which is formed based on a numerical aperture suitable for the second optical disk, and wherein a first hologram laser unit among the two hologram laser units to be used for performing recording and reproducing operations of information for the first optical disk comprises a light source, a photodetector, and a hologram element which are formed integrally with each other, wherein the hologram element comprises:

a first hologram for providing information signals from the optical disk to the photodetector, the first hologram being provided in an area having an effective diameter corresponding to a numerical aperture suitable for the optical disk; and a second hologram for compensating for only a transmitted amount of light traveling toward the optical disk from the light source, the second hologram being provided contiguously outside the first hologram.

7. An optical pickup device according to claim 6, further comprising a collimator lens, wherein the first hologram laser unit is disposed between the collimator lens and a focal point of the collimator lens.

* * * * *

UNITED STATES PATENT AND TRADEMARK OFFICE
CERTIFICATE OF CORRECTION

PATENT NO. : 6,388,977 B1
DATED : May 14, 2002
INVENTOR(S) : K. Sakai et al.

It is certified that error appears in the above-identified patent and that said Letters Patent is hereby corrected as shown below:

Column 1,
Line 28, change "1.2 -thick" to -- 1.2 mm-thick --.
Line 57, change "1.2 -thick" to -- 1.2 mm-thick --.

Column 10,
Lines 9-10, change "1.2 -thick" to -- 1.2 mm thick --.
Line 56, change "o n" to -- on --.
Line 60, change "w here" to -- where --.

Column 11,
Line 49, change "1.2 thick" to -- 1.2 mm-thick --.
Line 58, change "1.2 -thick" to -- 1.2 mm-thick --.
Line 62, change "1.2 -thick" to -- 1.2 mm-thick --.

Column 12,
Line 9, change "aperture. NA" to -- aperture NA --.
Line 47, change "to photodetector" to -- to the photodetector --.

Signed and Sealed this

Twenty-ninth Day of October, 2002

Attest:

*Attesting Officer*

JAMES E. ROGAN
*Director of the United States Patent and Trademark Office*